US012411661B2

(12) United States Patent
Cappetta

(10) Patent No.: US 12,411,661 B2
(45) Date of Patent: Sep. 9, 2025

(54) CONSTRUCTION OF INTEGRATION PROCESSES USING NATURAL LANGUAGE

(71) Applicant: Boomi, LP, Conshohocken, PA (US)

(72) Inventor: Christopher L. Cappetta, Conshohocken, PA (US)

(73) Assignee: Boomi, LP, Conshohocken, PA (US)

( * ) Notice: Subject to any disclaimer, the term of this patent is extended or adjusted under 35 U.S.C. 154(b) by 215 days.

(21) Appl. No.: 18/368,235

(22) Filed: Sep. 14, 2023

(65) Prior Publication Data

US 2025/0094132 A1 Mar. 20, 2025

(51) Int. Cl.
| | |
|---|---|
| *G06F 9/445* | (2018.01) |
| *G06F 3/0484* | (2022.01) |
| *G06F 8/30* | (2018.01) |
| *G06F 9/455* | (2018.01) |
| *G06F 40/279* | (2020.01) |
| *G06F 40/40* | (2020.01) |
| *H04L 29/08* | (2006.01) |

(52) U.S. Cl.
CPC .............. *G06F 8/30* (2013.01); *G06F 40/279* (2020.01); *G06F 40/40* (2020.01)

(58) Field of Classification Search
CPC .......... G06F 8/30; G06F 40/279; G06F 40/40; G06F 16/3344; G06F 8/33; G06F 8/34; G06F 9/453; G06F 40/284; G06F 9/455; G06F 16/9535; G06F 9/545; G06F 21/57; G06F 16/9038; G06N 3/006; G06N 20/00; H04L 67/535; H04L 63/1425; H04L 63/10; H04L 43/06

See application file for complete search history.

(56) References Cited

U.S. PATENT DOCUMENTS

| | | | | |
|---|---|---|---|---|
| 7,225,425 B2 * | 5/2007 | Kompalli | .................. | G06F 8/20 717/108 |
| 10,114,616 B2 * | 10/2018 | Delaney | .................... | G06F 8/60 |

FOREIGN PATENT DOCUMENTS

CN 116595993 A 8/2023

OTHER PUBLICATIONS

ISA,"Notification of Transmittal of the International Search Report and the Written Opinion of the International Searching Authority, or the Declaration" for PCT/US2024/045138, Mailed on Dec. 2, 2024, 12pgs.

Karthik Chandraraj,"Generative AI and its impact on Software Development," May 30, 2023, Inspiringbrillance, 8pgs.

(Continued)

*Primary Examiner* — Thuy Dao
(74) *Attorney, Agent, or Firm* — Procopio, Cory, Hargreaves & Savitch, LLP

(57) ABSTRACT

Currently, there is no means for a user to build an integration process using natural language. Accordingly, in an embodiment, a user submits a user request via natural language (e.g., via interaction with a screen-based or voice-based chatbot). Embodiments wrap the user request with a contextual wrapper to generate a prompt, submit the prompt to a generative AI model (e.g., large language model) to produce an actionable set of objectives, and then programmatically and recursively generate software instances of each necessary component, including the final integration process, based on the set of objectives and using the generative AI model.

20 Claims, 3 Drawing Sheets

(56) References Cited

OTHER PUBLICATIONS

Ken Jaroenchisakon, et al,"Introducing Boomi AI, a Generative AI Game-Changer for IT and Business Success," Published May 15, 2023, Boomi, LP, 8pgs.

Karthik Chandraraj,"Generative AI Software Architecture: Don't Replace Your Architects Yet!," Jun. 21, 2023, Inspiringbrillance, 11pgs.

\* cited by examiner

CONSTRUCTION OF INTEGRATION PROCESSES USING NATURAL LANGUAGE

BACKGROUND

Field of the Invention

The embodiments described herein are generally directed to integration, and, more particularly, to constructing integration processes using natural language.

Description of the Related Art

A number of services exist for generating integration processes. For example, Boomi® of Chesterbrook, Pennsylvania, provides integration platform as a service (iPaaS), which enables the integration of applications and data as a dynamic and elastic stand-up service. Boomi's iPaaS platform enables users to construct integration processes on their integration platforms from pre-built elements. These elements, which may be referred to as "steps" or "shapes" in Boomi's lexicon and herein, are represented as visual objects that can be moved around on a virtual canvas within a graphical user interface, using drag-and-drop operations. These visual objects can be connected together in endless combinations to build very simple to very complex integration processes. An example of such a graphical user interface is described in U.S. Pat. No. 8,533,661, issued on Sep. 10, 2013, which is hereby incorporated herein by reference as if set forth in full.

While such a graphical user interface is convenient and accessible to even novice users, it still requires the user to manually construct the integration process, element by element. Currently, there is no means for a user to build an integration process using natural language.

SUMMARY

Accordingly, systems, methods, and non-transitory computer-readable media are disclosed for the construction of integration processes using natural language. For example, in an embodiment, a user may simply describe a desired integration process in natural language, and the integration process may be automatically generated based on that description by iteratively applying a language model to construct and connect the necessary elements.

In an embodiment, a method comprises using at least one hardware processor to: receive a user request for an integration process, wherein the user request is expressed in natural language; generate a request-level prompt based on the user request and a contextual wrapper; input the request-level prompt to a generative artificial intelligence (AI) model to produce a set of objectives; extract any components, required for the integration process, from the set of objectives; process the extracted components by, for each extracted component, generating a component-level prompt, inputting the component-level prompt to the generative AI model to produce a component definition, and generating a software instance of the component from the component definition; generate a process-level prompt for the integration process based on the set of objectives and any component definitions; input the process-level prompt to the generative AI model to produce a process definition; and generate a software instance of the integration process based on the process definition. The generative AI model may comprise a large language model. The large language model may comprise a generative pre-trained transformer (GPT).

The request-level prompt may comprise one or more of: a role of the generative AI model; a summary of one or more elements available for use in the integration process; an output format; an example output, representing a programmatically actionable set of objectives; common design patterns; or one or more rules, guidelines, or constraints applicable to construction of the integration process. The request-level prompt may comprise the user request.

The extracted components may be processed in an order in which any extracted component that is dependent on another extracted component is processed after that other extracted component.

Extracting the components may comprise: generating an extraction prompt that requests a list of components be generated from the set of objectives; and inputting the extraction prompt to the generative AI model to produce the list of components as the extracted components. The extraction prompt may direct the generative AI model to sort the components, such that any component that is dependent on another component is listed after that other component in the list of components. The extraction prompt may comprise one or more of: a reference to the set of objectives; an output format; or one or more rules, guidelines, or constraints applicable to the list of components.

The component-level prompt may comprise one or more of: a role of the generative AI model; an output format; an example output; a list of the extracted components; or one or more rules, guidelines, or constraints applicable to the component definition.

The process-level prompt may comprise one or more of: a role of the generative AI model; an output format; an example output; a list of the extracted components with a reference to the software instance of each of the extracted components; the set of objectives; or one or more rules, guidelines, or constraints applicable to the integration process.

The method may further comprise using the at least one hardware processor to, after inputting the component-level prompt to the generative AI model to produce the component definition and before generating the software instance of the component, in each of one or more iterations, until no errors remain in the component definition or a number of the one or more iterations has reached a threshold: determine whether or not any errors exist in the component definition; and when at least one error exists in the component definition, re-input the component-level prompt to the generative AI model to produce a new component definition.

The method may further comprise using the at least one hardware processor to, after inputting the process-level prompt to the generative AI model to produce the process definition and before generating the software instance of the process, in each of one or more iterations, until no errors remain in the process definition or a number of the one or more iterations has reached a threshold: determine whether or not any errors exist in the process definition; and when at least one error exists in the process definition, re-input the process-level prompt to the generative AI model to produce a new process definition.

The process definition may comprise position information for each element in the integration process, and wherein the method further comprises using the at least one hardware processor to display a visual representation of the integration process on a virtual canvas within a graphical user interface, according to the position information.

Each component-level prompt and the process-level prompt may be expressed in natural language.

Each component definition and the process definition may be expressed in eXtensible Markup Language (XML).

The user request may be received via a graphical user interface, wherein the process definition comprises position information, and wherein the method further comprises using the at least one hardware processor to generate a visual representation of the integration process in the graphical user interface based on the position information.

The method may further comprise using the at least one hardware processor to deploy the software instance of the integration process to an integration environment.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for the construction of integration processes using natural language. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
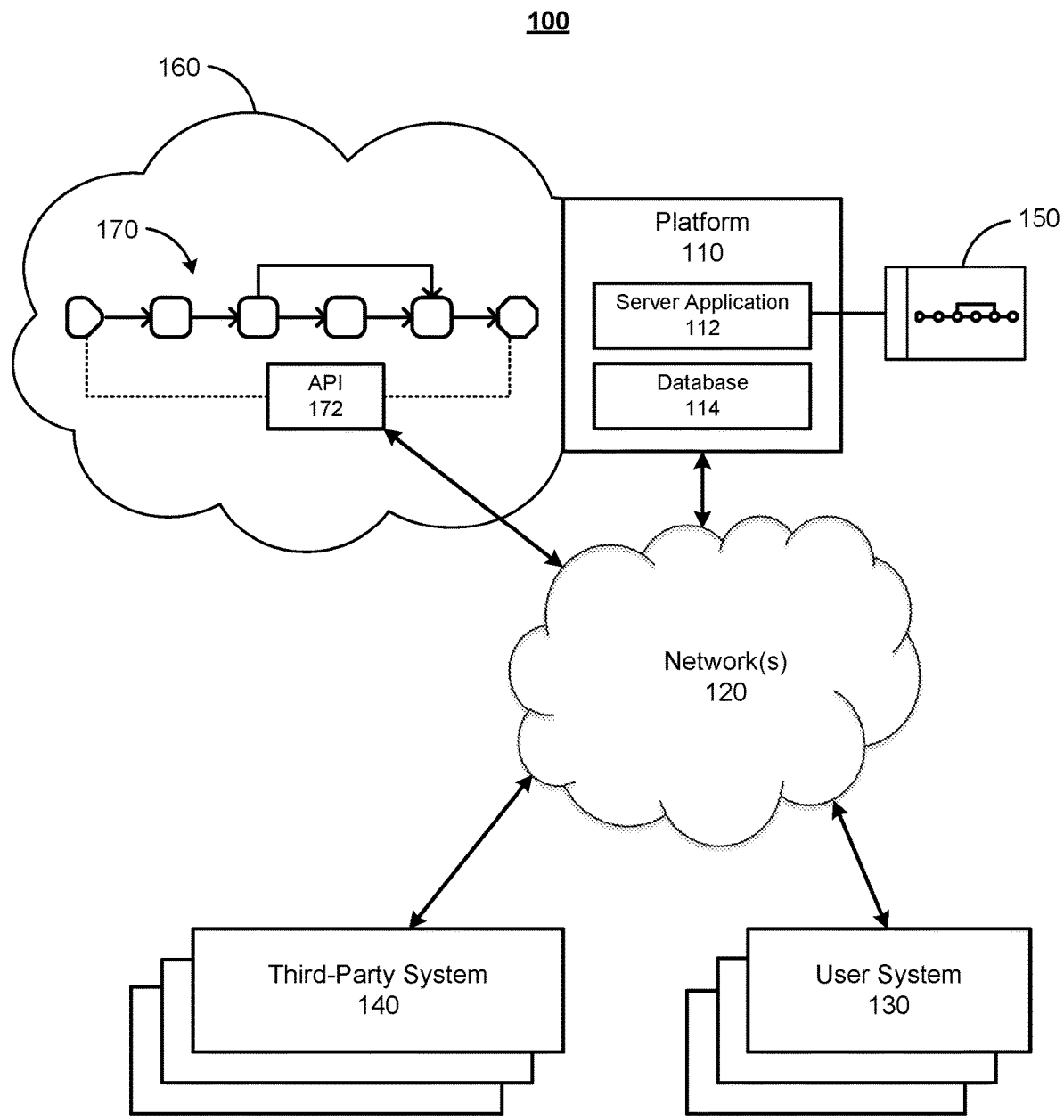
FIG. 1 illustrates an example infrastructure in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute a server application 112, which may comprise one or more software modules implementing one or more of the disclosed processes. Platform 110 may also manage one or more databases 114, which may store data used by server application 112.

Platform 110 may be communicatively connected to one or more networks 120. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems, including user system(s) 130 and/or third-party system(s) 140, through a single set of network(s) 120, it should be understood that platform 110 may be connected to the various systems via different sets of one or more networks. For example, platform 110 may be connected to a subset of systems via the Internet, but may be connected to another subset of systems via an intranet.

As mentioned above, platform 110 may be communicatively connected to one or more user systems 130 via network(s) 120. While only a few user systems 130 are illustrated, it should be understood that platform 110 may be communicatively connected to any number of user systems 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer that has a user account for accessing server application 112 on platform 110.

Server application 112 may manage an integration environment 160. In particular, server application 112 may provide a graphical user interface 150 and backend functionality, including one or more of the processes disclosed herein, to enable users, via user systems 130, to construct, develop, modify, save, delete, test, deploy, undeploy, and/or otherwise manage integration processes 170 within integration environment 160. Of particular relevance to the present disclosure, the backend functionality of server application 112 may include a process for constructing integration processes 170 using natural language.

Although only a single integration process 170 is illustrated, it should be understood that, in reality, integration environment 160 may comprise any number of integration processes 170. In an embodiment, integration environment 160 supports iPaaS. In this case, integration environment 160 may comprise one or a plurality of integration platforms that each comprises one or more integration processes 170. Each integration platform may be associated with an organization, which may be associated with one or more user accounts by which respective user(s) manage the organization's integration platform, including the various integration process(es) 170.

An integration process 170 may represent a transaction involving the integration of data between two or more systems, and may comprise a series of elements that specify logic and transformation requirements for the data to be integrated. Each element, which may also be referred to herein as a "step" or "shape," may transform, route, and/or otherwise manipulate data to attain an end result from input data. For example, a basic integration process 170 may receive data from one or more data sources (e.g., via an application programming interface 172 of the integration process 170), manipulate the received data in a specified manner (e.g., including analyzing, normalizing, altering, updated, enhancing, and/or augmenting the received data), and send the manipulated data to one or more specified destinations. An integration process 170 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The user of a user system 130 may authenticate with platform 110 using standard authentication means, to access server application 112 in accordance with permissions or roles of the associated user account. The user may then interact with server application 112 to construct, develop, modify, save, delete, test, deploy, undeploy, and/or otherwise manage one or more integration processes 170, for example, within a larger integration platform within integration environment 160. It should be understood that multiple users, on multiple user systems 130, may manage the same integration process(es) 170 and/or different integration processes 170 in this manner, according to the permissions or roles of their associated user accounts.

Each integration process 170, when deployed, may be communicatively coupled to network(s) 120. For example, each integration process 170 may comprise an application programming interface (API) 172 that enables clients to access integration process 170 via network(s) 120. A client may push data to integration process 170 through application programming interface 172 and/or pull data from integration process 170 through application programming interface 172.

One or more third-party systems 140 may be communicatively connected to network(s) 120, such that each third-party system 140 may communicate with an integration process 170 in production environment 160 via application programming interface 172. Third-party system 140 may host and/or execute a software application that pushes data to integration process 170 and/or pulls data from integration process 170, via application programming interface 172. Additionally or alternatively, an integration process 170 may push data to a software application on third-party system 140 and/or pull data from a software application on third-party system 140, via an application programming interface of the third-party system 140. Thus, third-party system 140 may be a client or consumer of one or more integration processes 170, a data source for one or more integration processes 170, and/or the like. As examples, the software application on third-party system 140 may comprise, without limitation, enterprise resource planning (ERP) software, customer relationship management (CRM) software, accounting software, and/or the like.

2. Example Process

Figure 2:
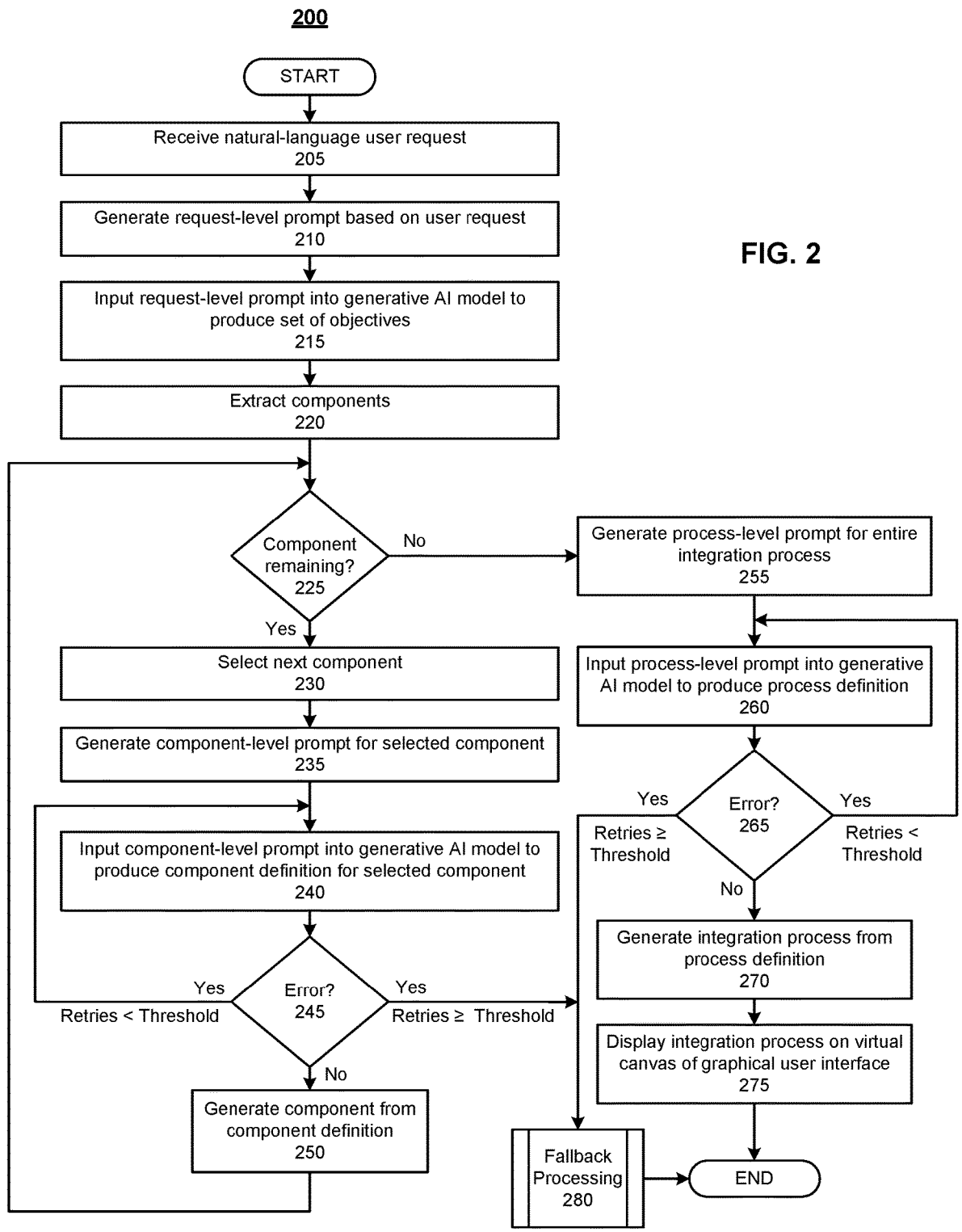
FIG. 2 illustrates an example process for constructing an integration process using natural language, according to an embodiment.

FIG. 2 illustrates an example process 200 for the construction of an integration process 170 using natural language, according to an embodiment. Process 200 may be implemented by server application 112. While process 200 is illustrated with a certain arrangement and ordering of subprocesses, process 200 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Initially, in subprocess 205, a natural-language user request may be received. A natural-language user request is a request to generate an integration process 170 that is expressed in natural language. In particular, the request may describe, in the user's natural language, the integration process 170, including potentially one or more characteristics (e.g., the data to be integrated, the data source, the data destination, the purpose of the integration process 170, an action to be performed on the data, etc.) of the integration process 170 to be constructed. It should be understood that, as used herein, "natural language" refers to the language that the user would use in a natural conversation with another human. Subprocess 205 may comprise the user typing the user request into a textbox of graphical user interface 150. Alternatively or additionally, subprocess 205 may comprise the user speaking into a microphone of user system 130 with an audio interface of server application 112. In this latter case, user system 130 or server application 112 may convert the user's speech into text, representing the user's request, using a standard speech-to-text engine. Whether the user inputs the user request through a graphical user interface or audio interface, the user may interact with a chatbot service implemented by server application 112.

As an example, the user request, whether initially expressed in writing or in speech, may be:

I would like to create a process that queries data from Snowflake and pushes it into SAP.

In the above example, the user has requested an integration process 170 that queries data from a data source (i.e., Snowflake™, which is a cloud-enabled data warehouse offered by SAP SE of Walldorf, Baden-Wurttemberg, Germany) to a data destination (i.e., SAP software on a third-party platform 140).

In subprocess 210, a request-level prompt is generated based on the user request. In an embodiment, the request-level prompt is generated based on the user request and a contextual wrapper or pre-conversation. The contextual wrapper may be fabricated after receipt of the user request in subprocess 205 (e.g., in real time), or may be pre-fabricated for reuse with a plurality of user requests. In the latter case, the contextual wrapper may be a template with portions that are pre-fabricated and portions that are fabricated after receipt of the user request in subprocess 205, potentially based on the user request. In an embodiment, the request-level prompt is generated by seeding or populating the contextual wrapper with the user request. Regardless of how it is generated, the request-level prompt may represent the user request in an actionable format and in natural language.

The contextual wrapper of the request-level prompt may comprise a description of a role (e.g., assistant to an integration developer) to be played by a generative artificial intelligence (AI) model, a general description of integration processes, a summary of one or more, including potentially all, possible elements available for use in integration processes (e.g., all pre-built elements that server application 112 makes available for integration processes), the desired output format, an example output in the desired output format, common design patterns, rules, guidelines, and/or constraints applicable to the construction of integration processes, and/or the like. In subprocess 210, the original user request, received in subprocess 205, may be appended to or otherwise combined with the contextual wrapper, or a user request that is derived from the original user request (e.g., modified to fit a specific format) may be appended to or otherwise combined with the contextual wrapper. In an embodiment, the resulting request-level prompt represents a request to provide a set of objectives for generating the integration process 170. The request-level prompt may be designed to steer a generative AI model towards a specific set of contextual formats and objectives required to construct the integration process 170. Continuing the example above, the request-level prompt that is produced for the user request above may be:

[
{'role': 'system', 'content': '
You are an assistant to a Boomi integration developer and I will ask you to think step by step for the following objective.
Boomi processes and components are built with drag-and-drop shapes on a canvas within the cloud tooling. They process documents flowing down paths and at each different shape along the way data is transformed, or external systems are invoked.
Boomi documents are chunks of specific data flowing through each shape within a process. Once a shape is invoked it could pass through the existing documents (e.g. a notify shape does not change the document), or could create new documents (e.g. a connector shape could have a request payload and could generate a new response payload document to send further down the path). If there are multiple distinct sets of data even going to the same target system these would generally be handled as separate branches and paths so as to not have a single shape relying on two different expected document formats. For example if data is being saved to two database tables within the same database those would be two distinct paths and piece of functionality.
The Boomi developer will provide you with a high level summary of their objectives and you will be responsible for summarizing their free-form request into a sequential list of appropriate Boomi shapes (and their underlying components) that will need to be generated and added to the integration process.
Boomi shapes go on an individual process canvas, and Boomi components are re-usable across many processes and shapes. Boomi has many shapes and components. Below we will review some of the most commonly used, which you may include in your design. Note that some shapes will only appear on the process canvas and do not need a component. Examples of this are Notify shapes and Branch shapes. Some shapes do require a component, like a Map Shape. The Map Shape on the canvas would reference a Map component that is re-usable across processes and shapes. Furthermore, some components also include components within their own configuration. Continuing the example of a Map component - it will reference two profile components... a source profile and a target profile.
All integration processes begin with a start shape that can be configured in a number of different ways. It can pass data from a higher level wrapper process (via a "Data Passthrough" start shape), or can query data from an external system, or can listen for a call to it\'s designated URI from an external mechanism. Additionally a process can be triggered with a "No Data Shape" which will launch the process with a blank document (this is often used if the process will be triggered manually or on a schedule).
Please specify a start shape in all processes you define. If the process is intended to be a listener process, the start shape must be a Web Services Server (WSS) start shape, which will have its action configuration as \'listen\' and will reference a WSS operation component. The operation component will include a request profile component and/or a response profile component with the expected inputs and output from the process as a whole. If the start shape is a WSS shape then any "Return Documents" shapes further down the path will automatically return the data in the format of the response profile from the WSS start shape without that profile being configured in the Return Documents shape itself.
Connector shapes (either protocol level "Technology connectors" like JDBC and HTTP, or application specific "Branded connectors" like Netsuite or Salesforce) query data from and push data to outside systems. When deciding whether to use a technology connector or a branded application connector please refer to what you know about Boomi and determine whether there is an appropriate branded connector. If you aren\'t confident, then default to a technology connector of the appropriate protocol for what you know the target system expects. Each connector shape will be made up of a connection component (generally with a URI and credentials) and an operation component (which generally itself references a request profile component and/or a response profile component).
When describing each shape to be included please include the necessary components that will be nested within the shape (which can potentially have multiple layers as we discussed).
Please also specify the specific keyword for the component and shape in a json object with the keys "shape", "component" and "connector" where appropriate. Here is a full list of valid shape keywords: map_shape, set_properties_shape, message_shape, notify_shape, program_command_shape, process_call_shape, process_route_shape, data process_shape, find_changes_shape, add_to_cache_shape, retrieve_from_cache_shape, remove_from_cache_shape, branch_shape, route_shape, cleanse_shape, decision_shape, exception_shape, stop_shape, return_documents_shape, flow_control_shape, business_rules_shape, try_catch_shape, connector_shape, trading_partner_shape. Here is a full list of valid component keywords: process_component, connection_component, api_service_component, trading_partner_component, api_proxy_component, communication_channel_component, connector_operation_component, cross_reference_table_component, custom_library_component, database_profile_component, document_cache_component, edi_profile_component, flat_file_component, flow_service_component, json_profile_component, map_component, map_function_component, map_script_component, organization_component, pgp_certificate_component, process_property_component, process_route_component, process_script_component, processing_group_component, queue_component, x509_certificate_component, xml_profile_component, xslt_stylesheet_component. Any connector shape will be associated with a specific connector, and most (but not all) will generally be comprised of a connection component and a connector operation component. Here is a list of valid connector keywords:
agiloft_clm_partner_connector, aible_ai_partner_connector, alleantia_iot_partner_connector, amazon_redshift_connector, amazon_s3_connector, amazon_s3_rest_connector, amazon_sns_connector, anaplan_legacy_connector, anaplan_connector, aprimo_connector, aria_partner_connector, autotask_connector, boomi_atomsphere_api_connector, atomsphere_partner_api_connector, boomi_axis_for_sap_connector, boomi_flow_client_connector, boomi_master_data_hub-connector, boomi_master_data_hub_listener_connector, box_connector, cloudblue_connect_partner_connector, coupa_connector, fiix_partner_connector, google_ad_manager_connector, google_bigquery_connector, google_g_suite_connector, google_sheets_connector, google_storage_connector, great_plains_connector, hadoop_connector, ifs_rest_partner_connector, ifs_fsm_rest_connector, innotas_partner_connector, intacct_connector, jira_rest_connector, kanverse_idp_partner_connector, laserfiche_partner_connector, live_optics_connector, lumesse_talentlink_partner_connector, magento_connector, marketo_partner_connector, marketo_rest_connector, microsoft_azure_blob_storage_connector, microsoft_azure_data_lake_storage_connector, microsoft_azure_sql_data_warehouse_connector, microsoft_azure_sql_database_connector, microsoft_dynamics_365_for_customer_engagement_connector, microsoft_dynamics_365_for_finance_and_operations_connector, microsoft_dynamics_ax_connector, microsoft_dynamics_crm_connector, microsoft_dynamics_gp_connector, microsoft_sql_server_bcp_connector, microsoft_teams_connector, mongodb_connector, netsuite_connector, netsuite_openair_connector, oanda_partner_connector, okta_connector, openlegacy_generic_connector, openmanage_enterprise_connector, oracle_crm_on_demand_connector, oracle_database_connector, oracle_e_business_ebs_connector, oracle_e_business_suite_v2_connector, oracle_fusion_connector, oracle_sql_loader_connector, powersteering_partner_connector, pricefx_partner_connector, quickbooks_connector, quickbooks_online_connector, radius_by_campus_management_connector, rightnow_partner_connector, saba_talentspace_connector, sage_50_peachtree_connector, salesforce_connector, salesforce_analytics_connector, salesforce_apex_connector, salesforce_marketing_cloud_connector, sap_connector, sap_business_bydesign_connector, sap_hana_database_connector, sap_jco_v2_connector, sap_s4hana_odata_connector, servicenow_connector, servicenow_rest_connector, shopify_connector, signifyd_partner_connector, slack_connector, snowflake_connector, successfactors_partner_connector, sugarcrm_rest_connector, taleo_connector, taleo_rest_connector, teqtron_agile_plm_partner_connector, thru_mft_partner_connector, toad_intelligence_central_connector, twilio_connector, ultipro_connector, workday_connector, workday_prism_analytics_tech_preview_connector, workday_prism_analytics_v2_connector, zuora_connector, zuora_rest_connector, amazon_eventbridge_connector, amazon_sqs_connector, boomi_atom_queue_connector, google_pub_sub_connector, jms_connector, jms_v2_connector, kafka_connector, microsoft_azure_service_bus_connector, rabbitmq_connector, salesforce_platform_events_connector, solace_pubsub_partner_connector, as2_client_connector, as2_server_connector_legacy, as2_shared_server_connector, database_connector, database_v2_connector, disk_connector, disk_v2_connector, ftp_connector, ftp_v2_connector, http_client_connector, http_patch_client_connector, ldap_connector, ldap_legacy_connector, mail_connector, mail_imap_connector, microsoft_azure_cosmos_db_connector, mlpp_client_connector, mlpp_server_connector, mqtt_connector, odata_client_connector, openapi_tech_preview_connector, rest_client_tech_preview_connector, sftp_connector, sftp_v2_connector, web_services_server_connector, web_services_soap_client_connector. Some connectors may be listener start shapes, like a Web Services Server or a Flow Services Server. For example:
1. No Data start shape
   {"shape": "no_data_shape", "start_shape": "true"}
2. Try catch shape
   {"shape": "try_catch_shape"}
3. [Try Path] Would be Salesforce connector shape, so adding placeholder Notify shape
   a. Would generate a Salesforce connector shape, connection component, and connector operation component but instead will populate a Notify shape with details about this placeholder step. {"shape": "notify_shape"}
4. [Try Path] Map shape
   a. Generate or use the Salesforce Response XML Profile as the source profile of this map{"component": "xml_profile_component"}
   b. Generate or use the Netsuite Request XML profile as the destination profile component of this map{"component": "xml_profile_component"}
   c. Generate a map component referencing the source profile component and the destination profile component above. {"component": "map_component"}
   d. Add Map shape to canvas referencing the map component above. {"shape": "map_shape"}
5. [Try Path] Would be Netsuite connector shape, so adding placeholder Notify shape
   a. Would generate a Netsuite connector shape, connection component, and connector operation component but instead willNotify populate a shape with details about this placeholder step. {"shape": "notify_shape"}
6. [Try Path] Stop shape
   {"shape": "stop_shape"}
7. [Catch Path] Notify shape to include try-catch error message notification
   {"shape": "notify_shape"}
8. [Catch Path] Stop shape
   {"shape": "stop_shape"}
Profile components define an expected payload and can handle JSON, XML, Database, and Flat File data formats. Most database connections will happen through the Boomi Database connector and will use a proprietary Database profile. Most APIs will use JSON or XML profiles. Flat File profiles are beneficial for handling files, CSV format payloads, or other data with less structure than the other formats. When you are indicating that a profile needs to be created please provide which of these data formats you think it will be, based on your knowledge of the integration points and APIs of the systems in question.
Map shapes on the canvas reference a re-usable map component and allow data to be transformed from one data format to another. Map components will always reference a source profile component and a destination profile component. The source profile component will usually be the response profile component of the prior connector shape, and the destination profile will be the request profile of a subsequent connector shape. An exception to this would be when a listener start shape is used on the process; the request profile of the listener operation will end up being the source profile of a map following that start shape.
Stop shapes will end processing on a given path.
A "Return documents" shape will return the document to an external source (provided the external source called into a Boomi listener process). A return documents shape will happen in place of a stop shape, so only one of those would apply per branch or path within the process. No components need to be referenced by the "Return Documents" shape, it will automatically return whatever document format is reaching that shape and will often match a response profile in some sort of listener start shape and component like a WSS operation component.
Branch shapes allow a single document to flow down multiple paths. This is often used if the same initial data needs to be passed into multiple processing sequences, formats, or target destinations. For example if you receive a payload to a WSS listener shape and want to manipulate it into multiple target systems or data stores, a branch shape with a processing path for each target system is appropriate. If you\'re adding branch shapes to a design please specify [Branch 1], [Branch 2], etc. at the shape level of your summary.
Try catch shapes will send documents down a try path and if there is an error will pass them down the catch path. Anywhere that you have a catch path it is nice to include a notify shape (to provide developers with additional information about any potential issues). The catch path can then often have a Stop shape to continue attempting to process other documents, or will sometimes have an exception shape to halt all further processing. It is usually a good idea to include a try catch shape in most processes, and they will generally be placed directly after a start shape.
Introduce your reply by saying "I believe the following shapes and components will be required to achieve your objective:"
After you\'ve generated this list of process shapes and components please to not append any final "Note:" or contextual summary. We will be attempting to use the output programmatically.
As you are generating your summary, anywhere that there would be a connector shape please instead simply put a notify shape that will describe what that connector shape, connection component, and connector operation component will do once manually configured."
'},
{'role': 'user', 'content': 'I would like to create a process that queries data from snowflake and pushes it into SAP.'}
]

In subprocess 215, the request-level prompt, output by subprocess 210, is input into a generative AI model to produce the requested set of objectives. In an embodiment, the model comprises a large language model (LLM). Examples of large language models that may be used include any of the Generative Pre-trained Transformer (GPT) series of large language models created by OpenAI, L. P. of San Francisco, California. For instance, in a particular implementation, GPT-4 is used as the model in subprocess 215. However, it should be understood that other large language models, including other existing or future models in the GPT series, may be used.

In an embodiment, the desired output format included in the request-level prompt may define a programmatically actionable set (e.g., list) of objectives to be used for constructing elements of the integration process 170. In addition, the request-level prompt may comprise an example of a programmatically actionable set of objectives. Thus, the output of the model in subprocess 215 will be a programmatically actionable set of objectives that can then be used to construct the elements of the integration process 170.

In an embodiment, each objective in the set of objectives, output by subprocess 215, may comprise or represent either an element or a design pattern for one or more elements. Continuing the example above, the set of objectives, output by a generative AI model for the request-level prompt above may be:

I believe the following shapes and components will be required to achieve your objective:
1. No Data start shape
   {"shape": "no_data_shape", "start_shape": "true"}
2. Try catch shape
   {"shape": "try_catch_shape"}
3. [Try Path] Would be Snowflake connector shape, so adding placeholder Notify shape
   a. Would generate a Snowflake connector shape, connection component, and connector operation component but instead will populate a Notify shape with details about this placeholder step. {"shape": "notify_shape"}
4. [Try Path] Map shape
   a. Generate or use the Snowflake Response Database Profile as the source profile of this map{"component": "database_profile_component"}
   b. Generate or use the SAP Request XML profile as the destination profile component of this map{"component": "xml_profile_component"}
   c. Generate a map component referencing the source profile component and the destination profile component above. {"component": "map_component"}
   d. Add Map shape to canvas referencing the map component above. {"shape": "map_shape"}
5. [Try Path] Would be SAP connector shape, so adding placeholder Notify shape
   a. Would generate a SAP connector shape, connection component, and connector operation component but instead will populate a Notify shape with details about this placeholder step. {"shape": "notify_shape"}
6. [Try Path] Stop shape
   {"shape": "stop_shape"}
7. [Catch Path] Notify shape to include try-catch error message notification
   {"shape": "notify_shape"}
8. [Catch Path] Stop shape
   {"shape": "stop_shape"}

Notably, the output of the generative AI model is a numbered list of objectives that can each be acted upon by server application 112.

In subprocess 220, any components, required to complete the set of objectives, are extracted from the set of objectives, output by subprocess 215. In particular, at least a subset of the objectives may represent elements of the integration process 170 that require one or more components. For example, a map element may require a map component, which references at least two profile components. Thus, at least three components (i.e., a map component and two or more profile components) may be extracted from an objective involving a map element. Other elements of the integration process 170, represented in the set of objectives, may not require any components. For example, a branch element only manipulates data moving through the integration process 170, and therefore, does not reference any components. Thus, no components would be extracted from an objective that only involves a branch element. In addition, some objectives may represent a design pattern or layout into which the elements or a subset of the elements are to be arranged.

The component(s) may be extracted from the set of objectives using any suitable means. In a preferred embodiment, a generative AI model is used to extract the components from the set of objectives. In particular, an extraction prompt may be input to the generative AI model to produce a set of components from the set of objectives. This generative AI model, which may be a large language model, may be the same model that was applied in subprocess 215. Thus, any description of the generative AI model with respect to subprocess 215 applies equally to the generative AI model used in subprocess 220.

The extraction prompt, which may be generated (e.g., in real time) or retrieved (e.g., pre-fabricated), may request the generative AI model to generate a list of components from the set of objectives. The prompt may comprise a reference to the set of objectives that were generated in subprocess 215, the desired output format, rules, guidelines, and/or constraints applicable to the component extraction, and/or the like. This prompt may be input to the model to obtain a list of components. Continuing the example above, the extraction prompt may be:

---

{'role': 'user', 'content': 'Looking at your above summary and knowing what you know about Boomi integration process design (and particularly the need to sometimes nest smaller components like profile components inside larger components like connector operation components) please generate a JSON array of all components that will need to be created in an acceptable top-to-bottom order such that any components requiring a reference to a smaller component will be configured after the smaller component already exists. Also note that if there are components re-used across multiple components (e.g. a profile component used by both a map and a connector) only include those in the array to be created a single time. You may apply an internal reference ID to the JSON output if you so desire, which we could use later. Please include JSON keys for id (which can be a unique 6 character UUID for this set of data), component (using the underscore component keywords from the system message), summary (where you will specify which line item(s) in the original summary the component is being generated for), and a comma separated string of references to the line items (e.g. 3a, 5b) '}

---

Notably, in this example, the extraction prompt can be entirely pre-fabricated, since nothing in the extraction prompt depends on specifics of the integration process 170 being constructed.

In an alternative embodiments, components may be identified from the set of objectives using keyword or pattern matching. In this case, each available component may be associated with one or more keywords or a regular expression. When an objective, in the set of objectives, contains the keyword(s) or regular expression associated with a component, that component is extracted from the objective.

Alternatively, other forms of artificial intelligence, including machine learning, may be used to extract the components. For example, a semantic search using vector embeddings may be used to identify the components. In this case, available components may be converted into a searchable index of vector embeddings. Each objective may be converted into a query that is encoded into a vector embedding that is then used to search the index to identify the closest component within the embeddings space.

The components may need to be processed in a specific order. In particular, some types of components may depend on other types of components. In this case, the extracted components may be sorted, based on these dependencies, such that any component that depends on another component is processed after the component on which it depends. Advantageously, in an embodiment of subprocess 220 that utilizes a generative AI model, the extraction prompt may direct the generative AI model to sort the components in this manner, such that the output of the generative AI model is a list of components that has already been sorted according to dependencies (i.e., with each dependent component further down in the list than any component on which it depends). In addition, the extraction prompt may direct the model not to duplicate any components that are used more than once in the set of objectives, thereby eliminating redundant components. In an embodiment of subprocess 220 that does not utilize the generative AI model, the components may be sorted by appropriate logic that accounts for dependencies between different types of components.

Continuing the example above, the output of subprocess 220 may be:

```
[
  {
    "id": "a1b2c3",
    "component": "database_profile_component",
    "summary": "This component will be used as the source profile for
      the map component. It will represent the Snowflake response
      data.",
    "references": "4a"
  },
  {
    "id": "d4e5f6",
    "component": "xml_profile_component",
    "summary": "This component will be used as the destination
      profile for the map component. It will represent the SAP request
      data.",
    "references": "4b"
  },
  {
    "id": "g7h8i9",
    "component": "map_component",
    "summary": "This component will be used to transform the
      Snowflake response data into the SAP request format. It will
      reference the Snowflake response database profile component and
      the SAP request XML profile component.",
    "references": "4c"
  }
]
```

In this example, each extracted component is represented by an identifier, component name, summary that describes the component, and a reference to the objective in the set of objectives from which the component was extracted.

Assuming at least one component has been extracted in subprocess 220, a component definition is generated for each extracted component in respective iterations of subprocesses 225-250. In subprocess 225, it is determined whether or not any components remain to be defined from the set of components output by subprocess 220. When at least one component remains to be defined (i.e., "Yes" in subprocess 225), process 200 proceeds to subprocess 230 to consider the next component. When no components remain to be defined (i.e., "No" in subprocess 225), process 200 proceeds to subprocess 250.

In subprocess 230, the next component is selected from the set of components, extracted in subprocess 220. As discussed above, the components may be sorted, such that any component on which another component depends is selected before that dependent component. This ensures that a component will be defined before any of the components, which depend on that component, are defined.

In subprocess 235, a component-level prompt is generated for the selected component. In an embodiment, the component-level prompt is generated based on the selected component and a contextual wrapper. The contextual wrapper may be fabricated for each component individually (e.g., in real time), or may be pre-fabricated for reuse with a plurality of components. In the latter case, the contextual wrapper may be a template with portions that are pre-fabricated and portions that are fabricated individually for each component, potentially based on the component. In an embodiment, the component-level prompt is generated by seeding or populating the contextual wrapper with the information output for the component in subprocess 220. Regardless of how it is generated, the component-level prompt may represent a request, in natural language, to define the component.

The component-level prompt may comprise a description of a role to be played by a generative AI model, the desired output format, an example output in the desired output format, a request to generate the selected component, the list of components output by subprocess 220, the set of objectives output by subprocess 215, one or more rules, guidelines, or constraints applicable to the component definition, instructions for working around foreseeable issues, and/or the like. In an embodiment, the output format is eXtensible Markup Language (XML). For sturdiness, the component-level prompt may be cast as an update to an integration process 170. Continuing the example above, the component-level prompt, generated in subprocess 235, for the "database_profile_component" may be:

```
[{'role': 'system', 'content': '
You are an assistant to a Boomi integration developer. Boomi processes
and components are defined in XML format. Keep the componentId and
version parameters as empty strings. Use the folder ID Rjo1NzQ2Mjgx in
your XML payload. You will be tasked with creating an XML component
by the user, please reply with only the XML because we will be using the
output programmatically.
'}, {'role': 'user', 'content': 'Please create the XML for a
database_profile_component Boomi component. You may provide a
concise but useful name based on the purpose summary: This component
will be used as the source profile for the map component. It will represent
the Snowflake response data. A valid sample reference XML for such a
component is:
<bns:Component xmlns:bns="api.platform.boomi.com/"
xmlns:xsi="www.w3.org/2001/XMLSchema-instance" componentId=""
currentVersion="true" deleted="false" folderId="Rjo1NzQ2MjY0"
name="New Database Profile" type="profile.db" version="">
    <bns:encryptedValues/>
    <bns:description/>
    <bns:object>
        <DatabaseProfile strict="true" version="2">
            <ProfileProperties>
                <DatabaseGeneralInfo executionType="dbread"/>
            </ProfileProperties>
            <DataElements>
                <DBStatement isNode="true" key="2" name="Statement"
statementType="select" storedProcedure="" tableName="">
                    <DBFields isNode="true" key="3" name="Fields"
type="result set"/>
                    <DBParameters isNode="true" key="4" name="Parameters"/>
                    <sql/>
                </DBStatement>
            </DataElements>
        </DatabaseProfile>
    </bns:object>
</bns:Component>
. For context here are the other components that have already been
created, including their generated IDs [{\'id\': \'a1b2c3\',
\'component\': \'database_profile_component\', \'summary\': \'This
component will be used as the source profile for the map component. It
will represent the Snowflake response data.\', \'references\':
\'4a\'}, {\'id\': \'d4e5f6\', \'component\':
\'xml_profile_component\', \'summary\': \'This component will be used
as the destination profile for the map component. It will represent
the SAP request data.\', \'references\': \'4b\'}, {\'id\': \'g7h819\',
\'component\': \'map_component\', \'summary\': \'This component will
``` be used to transform the Snowflake response data into the SAP request format. It will reference the Snowflake response database profile component and the SAP request XML profile component.\', \'references\': \'4c\'}], and here is a summary of the overall use case of which this particular component is a part: I believe the following shapes and components will be required to achieve your objective:
1. No Data start shape
   {"shape": "no_data_shape", "start_shape": "true"}
2. Try catch shape
   {"shape": "try_catch_shape"}
3. [Try Path] Would be Snowflake connector shape, so adding placeholder Notify shape
   a. Would generate a Snowflake connector shape, connection component, and connector operation component but instead will populate a Notify shape with details about this placeholder step. {"shape": "notify_shape"}
4. [Try Path] Map shape
   a. Generate or use the Snowflake Response Database Profile as the source profile of this map{"component": "database_profile_component"}
   b. Generate or use the SAP Request XML profile as the destination profile component of this map{"component": "xml_profile_component"}
   c. Generate a map component referencing the source profile component and the destination profile component above. {"component": "map_component"}
   d. Add Map shape to canvas referencing the map component above. {"shape": "map_shape"}
5. [Try Path] Would be SAP connector shape, so adding placeholder Notify shape
   a. Would generate a SAP connector shape, connection component, and connector operation component but instead will populate a Notify shape with details about this placeholder step. {"shape": "notify_shape"}
6. [Try Path] Stop shape
   {"shape": "stop_shape"}
7. [Catch Path] Notify shape to include try-catch error message notification
   {"shape": "notify_shape"}
8. [Catch Path] Stop shape
   {"shape": "stop_shape"}'}]

In subprocess 240, the component-level prompt, output by subprocess 235, is input into a generative AI model to produce a definition of the selected component. This generative AI model, which may be a large language model, may be the same model that was applied in subprocesses 215 and/or 220. Thus, any description of the generative AI model with respect to subprocesses 215 and/or 220 applies equally to the generative AI model used in subprocess 240. The output of subprocess 240 will be a component definition in the desired output format (e.g., a JavaScript Objection Notation (JSON) element comprising or consisting of XML). Continuing the example above, the output of the generative AI model, in subprocess 240, for the component-level prompt for the "database_prof ile_component" above may be:

```
<bns:Component xmlns:bns=" api.platform.boomi.com/" xmlns:xsi ="
www.w3.org/2001/XMLSchema-instance" componentId=""
currentVersion="true" deleted="false" folderId="Rjo1NzQ2Mjgx"
name="Snowflake Response Database Profile" type="profile.db"
version="">
  <bns:encryptedValues/>
  <bns:description>This component will be used as the source profile
  for the map component. It will represent the Snowflake response
  data.</bns:description>
  <bns:object>
    <DatabaseProfile strict="true" version="2">
      <ProfileProperties>
        <DatabaseGeneralInfo executionType="dbread"/>
      </ProfileProperties>
      <DataElements>
        <DBStatement isNode="true" key="2" name="Statement"
        statementType="select" storedProcedure="" tableName="">
          <DBFields isNode="true" key="3" name="Fields"
          type="result set"/>
          <DBParameters isNode="true" key="4" name="Parameters"/>
          <sql/>
        </DBStatement>
      </DataElements>
    </DatabaseProfile>
  </bns:object>
</bns:Component>
```

In an embodiment, process 200 includes try/retry/fallback logic to handle errors in the component definitions (e.g., XML) that are output by the generative AI model in subprocess 240. In particular, in subprocess 245, the component definition may be checked for one or more errors. Any suitable means for detecting errors in the output format and/or content may be used. For example, the component definition may be checked for errors in the same or similar manner that source code is checked for errors during compilation, for example, to detect missing, invalid, or unsupported operators, unmatched brackets, unmatched quotation marks, undeclared or undefined variables, and/or the like. When at least one error is detected, subprocess 240 may be retried with the same component-level prompt or a regenerated component-level prompt. To prevent an infinite or futile loop, when the error(s) cannot be resolved, process 200 may perform fallback processing when the number of retries equals or exceeds a predefined threshold (e.g., three, five, etc.). When detecting an error while the number of retries has not exceeded the threshold (i.e., "Yes, Retries<Threshold" in subprocess 245), process 200 may return to process 240 to re-input the component-level prompt to the model to produce a new component definition. Alternatively, process 200 could return to subprocess 235 to regenerate the component-level prompt (e.g., by adjusting the contextual wrapper). When detecting an error after the number of retries has reached or exceeded the predefined threshold (i.e., "Yes, Retries≥Threshold" in subprocess 245), process 200 may proceed to fallback processing 280. Otherwise, when detecting no errors (i.e., "No" in subprocess 245), process 200 may proceed to subprocess 250. In an alternative embodiment, subprocess 245 may be omitted or other try/retry/fallback logic may be implemented.

In subprocess 250, the component may be generated from the component definition, output by the most recent iteration of subprocess 240. For example, the component definition may be provided to the application programming interface of a component-generation service of server application 112 or another application. The component-generation service may comprise an always-active listener process. A different component-generation service may be provided for each different type of component, or a single component-generation service may be provided for all types of components. In either case, in response, the component-generation service may generate a software instance of the component, according to the component definition, and return a reference to the software instance of the component. For example, the reference may comprise a unique component identifier for the software instance of the component, a Uniform Resource Identifier (URI) of the software instance of the component, and/or the like. Alternatively, the component-generation service could return a data structure representing the software instance itself.

It should be understood that subprocesses 230-250 will be performed for each component that was extracted in subprocess 220. Consequently, a software instance will be generated for each component that was extracted in subprocess 220, in a respective iteration of subprocess 250. Thus, it should be understood that similar examples to the above component-level prompt and component definition may be provided for the "xmlprofile_component" and "map_component" in the list of components output by subprocess 220.

Once all of the components, extracted in subprocess 220, have been generated, via an iteration of subprocesses 230-250, a process-level prompt may be generated for the entire integration process 170 in subprocess 255. In an embodiment, the process-level prompt is generated based on the generated components and a contextual wrapper. The contextual wrapper may be fabricated for the specific integration process 170 (e.g., in real time), or may be pre-fabricated for reuse with a plurality of integration processes 170. In the latter case, the contextual wrapper may be a template with portions that are pre-fabricated and portions that are fabricated individually for each integration process 170, potentially based on the integration process 170. In an embodiment, the process-level prompt is generated by seeding or populating the contextual wrapper with the set of objectives, output by subprocess 215, and the component definitions, output by any iterations of subprocess 250. Regardless of how it is generated, the process-level prompt may represent a request, in natural language, to define the integration process 170.

The process-level prompt may comprise a role to be played by a generative AI model, the desired output format (e.g., JSON object comprising or consisting of XML), an example output in the desired output format, a request to generate the integration process 170, the list of components output by subprocess 220 with a specific reference to the corresponding software instance of each component that was generated in an iteration of subprocess 250, the set of objectives output by subprocess 215, one or more rules, guidelines, or constraints applicable to the construction of the integration process 170, and/or the like.

In subprocess 260, the process-level prompt, output by subprocess 255, is input into a generative AI model to produce a definition of the user-requested integration process 170. This generative AI model, which may be a large language model, may be the same model that was applied in subprocesses 215, 220, and/or 240. Thus, any description of the generative AI model with respect to subprocesses 215, 220, and/or 240 applies equally to the generative AI model used in subprocess 260. The output of subprocess 260 will be a process definition in the desired output format (e.g., JSON object comprising or consisting of XML). Continuing the example above, the output of subprocess 260 for the user request above may be:

```
<bns:Component xmlns:bns="api.platform.boomi.com/"
xmlns:xsi="www.w3.org/2001/XMLSchema-instance" componentId=""
deleted="false" folderId="Rjo1NzQ2Mjgx"
modifiedBy="user1@example.com" name="Snowflake_to_SAP_process"
type="process" version="">
    <bns:encryptedValues/>
    <bns:description/>
    <bns:object>
        <process allowSimultaneous="true" enableUserLog="false"
processLogOnErrorOnly="false" purgeDataImmediately="false"
updateRunDates="false" workload="general">
            <shapes>
                <shape image="start" name="shape1" shapetype="start"
userlabel="" x="48.0" y="48.0">
                    <configuration>
                        <passthroughaction/>
                    </configuration>
                    <dragpoints/>
                </shape>
                <shape image="catcherrors_icon" name="shape2"
shapetype="catcherrors" userlabel="" x="240.0" y="48.0">
                    <configuration>
                        <catcherrors catchAll="false" retryCount="0"/>
                    </configuration>
                    <dragpoints>
                        <dragpoint identifier="default" name="shape2.dragpoint1"
text="Try" toShape="shape3" x="416.0" y="56.0"/>
                        <dragpoint identifier="error" name="shape2.dragpoint2"
text="Catch" toShape="shape6" x="416.0" y="536.0"/>
                    </dragpoints>
                </shape>
                <shape image="notify_icon" name="shape3" shapetype="notify"
userlabel="This shape is a placeholder for a Snowflake connector
shape. Once ready to implement, this shape will be replaced by a
connector shape which will execute a SELECT operation against
Snowflake to retrieve data." x="416.0" y="48.0">
                    <configuration>
                        <notify disableEvent="true" enableUserLog="false"
perExecution="false" title="">
                            <notifyMessage>Placeholder for Snowflake Connector
Shape</notifyMessage>
                            <notifyMessageLevel>INFO</notifyMessageLevel>
                            <notifyParameters/>
                        </notify>
                    </configuration>
                    <dragpoints>
                        <dragpoint name="shape3.dragpoint1" toShape="shape4"
x="592.0" y="56.0"/>
                    </dragpoints>
                </shape>
                <shape image="map_icon" name="shape4" shapetype="map"
userlabel="" x="592.0" y="48.0">
                    <configuration>
                        <map mapId="6fac8398-8c82-47a6-bd4a-d20dbee36936"/>
                    </configuration>
                    <dragpoints>
                        <dragpoint name="shape4.dragpoint1" toShape="shape5"
x="768.0" y="56.0"/>
                    </dragpoints>
                </shape>
                <shape image="notify_icon" name="shape5" shapetype="notify"
userlabel="This shape is a placeholder for a SAP connector shape. Once
ready to implement, this shape will be replaced by a connector shape
which will send the transformed data to SAP." x="768.0" y="48.0">
                    <configuration>
                        <notify disableEvent="true" enableUserLog="false"
perExecution="false" title="">
                            <notifyMessage>Placeholder for SAP Connector
Shape</notifyMessage>
                            <notifyMessageLevel>INFO</notifyMessageLevel>
                            <notifyParameters/>
                        </notify>
                    </configuration>
                    <dragpoints>
                        <dragpoint name="shape5.dragpoint1" toShape="shape7"
x="944.0" y="56.0"/>
                    </dragpoints>
                </shape>
                <shape image="stop_icon" name="shape7" shapetype="stop"
userlabel="" x="944.0" y="48.0">
                    <configuration>
                        <stop continue="true"/>
                    </configuration>
                    <dragpoints/>
                </shape>
                <shape image="notify_icon" name="shape6" shapetype="notify"
userlabel="In the event of an error in the try path, this shape will
notify the developer with the error message from the try-catch shape."
x="416.0" y="536.0">
                    <configuration>
                        <notify disableEvent="true" enableUserLog="false"
perExecution="false" title="">
                            <notifyMessage>Try catch error message:
1</notifyMessage>
                            <notifyMessageLevel>INFO</notifyMessageLevel>
                            <notifyParameters>
```

-continued

```
        <parametervalue key="0" valueType="track">
            <trackparameter defaultValue=""
propertyId="meta.base.catcherrorsmessage" propertyName="Base -
Try/Catch Message"/>
        </parametervalue>
        </notifyParameters>
    </notify>
    </configuration>
    <dragpoints>
        <dragpoint name="shape6.dragpoint1" toShape="shape8"
x="592.0" y="536.0"/>
    </dragpoints>
    </shape>
    <shape image="stop_icon" name="shape8" shapetype="stop"
userlabel="" x="592.0" y="536.0">
        <configuration>
            <stop continue="true"/>
        </configuration>
        <dragpoints/>
    </shape>
    </shapes >
  </process>
  </bns:object>
  <bns:processOverrides/>
</bns:Component>
```

In an embodiment, process 200 includes try/retry/fallback logic to handle errors in the process definition (e.g., XML) that is output by the generative AI model in subprocess 260. In particular, in subprocess 265, the process definition may be checked for one or more errors. Subprocess 265 may be similar or identical to subprocess 245. Thus, any description of subprocess 245 applies equally to subprocess 265. When detecting an error while the number of retries has not exceeded the threshold (i.e., "Yes, Retries<Threshold" in subprocess 265), process 200 may return to process 260 to re-input the process-level prompt to the model to produce a new process definition. Alternatively, process 200 could return to subprocess 255 to regenerate the process-level prompt (e.g., by adjusting the contextual wrapper). When detecting an error after the number of retries has reached or exceeded the predefined threshold (i.e., "Yes, Retries-≥Threshold" in subprocess 265), process 200 may proceed to fallback processing 280. Otherwise, when detecting no errors (i.e., "No" in subprocess 265), process 200 may proceed to subprocess 270. In an alternative embodiment, subprocess 265 may be omitted or other try/retry/fallback logic may be implemented.

In subprocess 270, the integration process 170 may be generated from the process definition output by the most recent iteration of subprocess 260. For example, the process definition may be provided to the application programming interface of a process-generation service of server application 112 or another application. In an embodiment, the process-generation service is the same as the component-generation service utilized in subprocess 250. The process-generation service may comprise an always-active listener process. In response, the process-generation service may generate a software instance of the integration process 170, according to the process definition, and return a reference to the software instance of the integration process 170. For example, the reference may comprise a unique process identifier for the software instance of the integration process 170, a URI of the software instance of the integration process 170, and/or the like. Alternatively, the process-generation service could return a data structure representing the software instance itself.

As illustrated in the example above, the process definition may comprise coordinates or other position information for each element in the integration process 170. These coordinates may correspond to positions on the virtual canvas of graphical user interface 150. Thus, in an optional step 275, a visual representation of the integration process 170, generated in subprocess 270, may be displayed on the virtual canvas of graphical user interface 150 according to the position information provided by the process definition. Subsequently, the user may utilize the virtual canvas to manage the integration process 170, as desired. For example, the user may, via graphical user interface 150, reposition elements (e.g., via drag-and-drop operations) in the integration process 170, reconfigure elements of the integration process 170, or otherwise modify the integration process 170. In addition, the user may, via graphical user interface 150, save, test, and/or deploy the integration process 170.

Fallback processing 280 may comprise any suitable fallback mechanism. For example, fallback process 280 may automatically (i.e., without user intervention) or semi-automatically (e.g., with user confirmation) restart subprocess 200 from subprocess 210 or 215, prompt the user to input a new user request to restart subprocess 200 from subprocess 205, alert the user without attempting to restart process 200, display an error message, or the like.

In an embodiment, during execution of process 200, feedback may be provided to the user via graphical user interface 150 or an audio interface between the user and server application 112. Thus, the user may monitor each subprocess in process 200, for example, to review the prompts that are generated, the outputs of the generative AI model, and/or the like. The user may also be provided with one or more inputs to pause or otherwise disrupt process 200, modify the generated prompts, modify the outputs of the generative AI model, and/or the like.

In an embodiment, the integration process 170 is treated like any other component (e.g., with the same contextual wrapper). In other words, the integration process 170 is a component that depends on all of the other components, and therefore, is generated last. In this case, the integration process 170 is selected in a final iteration of subprocess 230, and subprocesses 255-270 are simply the final iterations of subprocesses 235-250, respectively. Thus, it should be understood that the treatment of the process-level prompt and process definition as distinct from the component-level prompts and component definitions is merely for the sake of understanding features near the end of process 200.

In summary, process 200 enables a user to engage with a screen-based or audio-based chatbot or other service (e.g., provided by server application 112). Process 200 interprets the user request, wraps the user request with a contextual wrapper to generate a prompt, submits the prompt to a generative AI model to produce an actionable set of objectives, and then programmatically and recursively generates software instances of each necessary component, including the final integration process 170, based on the set of objectives and using the generative AI model. The final integration process 170 may be visually represented in graphical user interface 150 for modification, deployment, or other management by the user. When deployed, the integration process 170 may be instantiated in integration environment 160 to perform the function(s) for which it was designed.

3. Example Processing System

Figure 3:
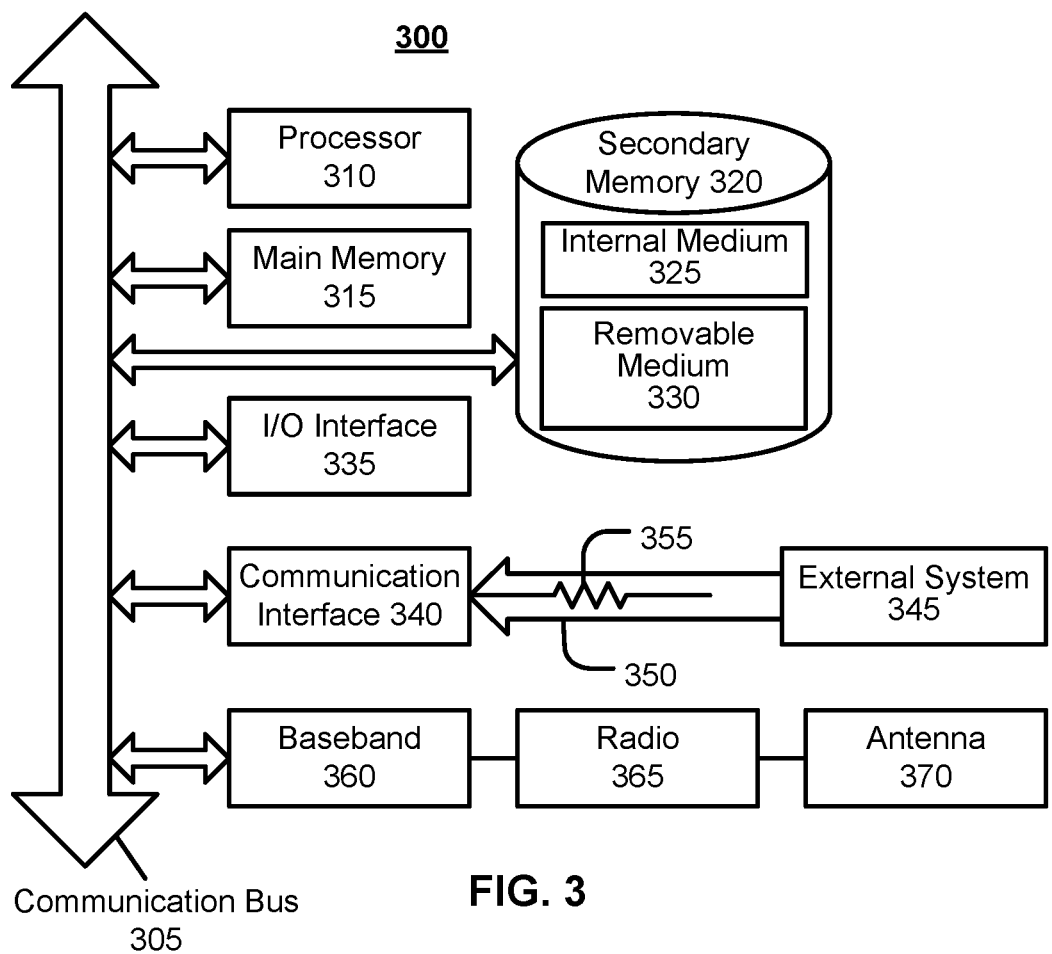
FIG. 3 illustrates an example processing system, by which one or more of the processes described herein may be executed, according to an embodiment.

FIG. 3 illustrates an example processing system, by which one or more of the processes described herein may be executed, according to an embodiment. For example, system 300 may be used to store and/or execute software that implements process 200, and/or may represent components of platform 110, user system(s) 130, third-party system(s) 140, and/or other processing devices described herein. System 300 can be any processor-enabled device (e.g., server, personal computer, etc.) that is capable of wired or wireless data communication. Other processing systems and/or architectures may also be used, as will be clear to those skilled in the art.

System 300 may comprise one or more processors 310. Processor(s) 310 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 310. Examples of processors which may be used with system 300 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N. V. of Eindhoven, Netherlands, and/or the like.

Processor(s) 310 may be connected to a communication bus 305. Communication bus 305 may include a data channel for facilitating information transfer between storage and other peripheral components of system 300. Furthermore, communication bus 305 may provide a set of signals used for communication with processor 310, including a data bus, address bus, and/or control bus (not shown). Communication bus 305 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 300 may comprise main memory 315. Main memory 315 provides storage of instructions and data for programs executing on processor 310, such as any of the software discussed herein. It should be understood that programs stored in the memory and executed by processor 310 may be written and/or compiled according to any suitable language, including without limitation C/C++, Java, JavaScript, Perl, Python, Visual Basic, NET, and the like. Main memory 315 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 300 may comprise secondary memory 320. Secondary memory 320 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 300. The computer software stored on secondary memory 320 is read into main memory 315 for execution by processor 310. Secondary memory 320 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 320 may include an internal medium 325 and/or a removable medium 330. Internal medium 325 and removable medium 330 are read from and/or written to in any well-known manner. Internal medium 325 may comprise one or more hard disk drives, solid state drives, and/or the like. Removable storage medium 330 may be, for example, a magnetic tape drive, a compact disc (CD) drive, a digital versatile disc (DVD) drive, other optical drive, a flash memory drive, and/or the like.

System 300 may comprise an input/output (I/O) interface 335. I/O interface 335 provides an interface between one or more components of system 300 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 300 may comprise a communication interface 340. Communication interface 340 allows software to be transferred between system 300 and external devices, networks, or other information sources. For example, computer-executable code and/or data may be transferred to system 300 from a network server via communication interface 340. Examples of communication interface 340 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 300 with a network (e.g., network(s) 150) or another computing device. Communication interface 340 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 340 is generally in the form of electrical communication signals 355. These signals 355 may be provided to communication interface 340 via a communication channel 350 between communication interface 340 and an external system 345. In an embodiment, communication channel 350 may be a wired or wireless network (e.g., network(s) 120), or any variety of other communication links. Communication channel 350 carries signals 355 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 315 and/or secondary memory 320. Computer-executable code can also be received from an external system 345 via communication interface 340 and stored in main memory 315 and/or secondary memory 320. Such computer-executable code, when executed, enables system 300 to perform the various functions of the disclosed embodiments as described elsewhere herein.

In an embodiment that is implemented using software, the software may be stored on a computer-readable medium and initially loaded into system 300 by way of removable medium 330, I/O interface 335, or communication interface 340. In such an embodiment, the software is loaded into system 300 in the form of electrical communication signals 355. The software, when executed by processor 310, preferably causes processor 310 to perform one or more of the processes and functions described elsewhere herein.

System 300 may optionally comprise wireless communication components that facilitate wireless communication over a voice network and/or a data network (e.g., in the case of user system 130). The wireless communication components comprise an antenna system 370, a radio system 365, and a baseband system 360. In system 300, radio frequency (RF) signals are transmitted and received over the air by antenna system 370 under the management of radio system 365.

In an embodiment, antenna system 370 may comprise one or more antennae and one or more multiplexors (not shown) that perform a switching function to provide antenna system 370 with transmit and receive signal paths. In the receive path, received RF signals can be coupled from a multiplexor to a low noise amplifier (not shown) that amplifies the received RF signal and sends the amplified signal to radio system 365.

In an alternative embodiment, radio system 365 may comprise one or more radios that are configured to communicate over various frequencies. In an embodiment, radio system 365 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 365 to baseband system 360.

If the received signal contains audio information, then baseband system 360 decodes the signal and converts it to an analog signal. Then the signal is amplified and sent to a speaker. Baseband system 360 also receives analog audio signals from a microphone. These analog audio signals are converted to digital signals and encoded by baseband system 360. Baseband system 360 also encodes the digital signals for transmission and generates a baseband transmit audio signal that is routed to the modulator portion of radio system 365. The modulator mixes the baseband transmit audio signal with an RF carrier signal, generating an RF transmit signal that is routed to antenna system 370 and may pass through a power amplifier (not shown). The power amplifier amplifies the RF transmit signal and routes it to antenna system 370, where the signal is switched to the antenna port for transmission.

Baseband system 360 is communicatively coupled with processor(s) 310, which have access to memory 315 and 320. Thus, software can be received from baseband processor 360 and stored in main memory 310 or in secondary memory 320, or executed upon receipt. Such software, when executed, can enable system 300 to perform the various functions of the disclosed embodiments.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive a user request for an integration process, wherein the user request is expressed in natural language;
   generate a request-level prompt based on the user request and a contextual wrapper;
   input the request-level prompt to a generative artificial intelligence (AI) model to produce a set of objectives;
   extract any components, required for the integration process, from the set of objectives;
   process the extracted components by, for each extracted component,
      generating a component-level prompt,
      inputting the component-level prompt to the generative AI model to produce a component definition, and
      generating a software instance of the component from the component definition;

generate a process-level prompt for the integration process based on the set of objectives and any component definitions;
input the process-level prompt to the generative AI model to produce a process definition; and
generate a software instance of the integration process based on the process definition.

2. The method of claim 1, wherein the generative AI model comprises a large language model.

3. The method of claim 2, wherein the large language model comprises a generative pre-trained transformer (GPT).

4. The method of claim 1, wherein the request-level prompt comprises one or more of:
a role of the generative AI model;
a summary of one or more elements available for use in the integration process;
an output format;
an example output, representing a programmatically actionable set of objectives;
common design patterns; or
one or more rules, guidelines, or constraints applicable to construction of the integration process.

5. The method of claim 4, wherein the request-level prompt comprises the user request.

6. The method of claim 1, wherein the extracted components are processed in an order in which any extracted component that is dependent on another extracted component is processed after that other extracted component.

7. The method of claim 1, wherein extracting the components comprises:
generating an extraction prompt that requests a list of components be generated from the set of objectives; and
inputting the extraction prompt to the generative AI model to produce the list of components as the extracted components.

8. The method of claim 7, wherein the extraction prompt directs the generative AI model to sort the components, such that any component that is dependent on another component is listed after that other component in the list of components.

9. The method of claim 7, wherein the extraction prompt comprises one or more of:
a reference to the set of objectives;
an output format; or
one or more rules, guidelines, or constraints applicable to the list of components.

10. The method of claim 1, wherein the component-level prompt comprises one or more of:
a role of the generative AI model;
an output format;
an example output;
a list of the extracted components; or
one or more rules, guidelines, or constraints applicable to the component definition.

11. The method of claim 1, wherein the process-level prompt comprises one or more of:
a role of the generative AI model;
an output format;
an example output;
a list of the extracted components with a reference to the software instance of each of the extracted components;
the set of objectives; or
one or more rules, guidelines, or constraints applicable to the integration process.

12. The method of claim 1, further comprising using the at least one hardware processor to, after inputting the component-level prompt to the generative AI model to produce the component definition and before generating the software instance of the component, in each of one or more iterations, until no errors remain in the component definition or a number of the one or more iterations has reached a threshold:
determine whether or not any errors exist in the component definition; and
when at least one error exists in the component definition, re-input the component-level prompt to the generative AI model to produce a new component definition.

13. The method of claim 1, further comprising using the at least one hardware processor to, after inputting the process-level prompt to the generative AI model to produce the process definition and before generating the software instance of the process, in each of one or more iterations, until no errors remain in the process definition or a number of the one or more iterations has reached a threshold:
determine whether or not any errors exist in the process definition; and
when at least one error exists in the process definition, re-input the process-level prompt to the generative AI model to produce a new process definition.

14. The method of claim 1, wherein the process definition comprises position information for each element in the integration process, and wherein the method further comprises using the at least one hardware processor to display a visual representation of the integration process on a virtual canvas within a graphical user interface, according to the position information.

15. The method of claim 1, wherein each component-level prompt and the process-level prompt are expressed in natural language.

16. The method of claim 1, wherein each component definition and the process definition are expressed in eXtensible Markup Language (XML).

17. The method of claim 1, wherein the user request is received via a graphical user interface, wherein the process definition comprises position information, and wherein the method further comprises using the at least one hardware processor to generate a visual representation of the integration process in the graphical user interface based on the position information.

18. The method of claim 1, further comprising using the at least one hardware processor to deploy the software instance of the integration process to an integration environment.

19. A system comprising:
at least one hardware processor; and
software that is configured to, when executed by the at least one hardware processor,
receive a user request for an integration process, wherein the user request is expressed in natural language,
generate a request-level prompt based on the user request and a contextual wrapper,
input the request-level prompt to a generative artificial intelligence (AI) model to produce a set of objectives,
extract any components, required for the integration process, from the set of objectives,
process the extracted components by, for each extracted component,
generating a component-level prompt,
inputting the component-level prompt to the generative AI model to produce a component definition, and generating a software instance of the component from the component definition, generate a process-level prompt for the integration process based on the set of objectives and any component definitions, input the process-level prompt to the generative AI model to produce a process definition, and generate a software instance of the integration process based on the process definition.

20. A non-transitory computer-readable medium having instructions stored therein, wherein the instructions, when executed by a processor, cause the processor to:

receive a user request for an integration process, wherein the user request is expressed in natural language;

generate a request-level prompt based on the user request and a contextual wrapper;

input the request-level prompt to a generative artificial intelligence (AI) model to produce a set of objectives;

extract any components, required for the integration process, from the set of objectives;

process the extracted components by, for each extracted component, generating a component-level prompt, inputting the component-level prompt to the generative AI model to produce a component definition, and generating a software instance of the component from the component definition;

generate a process-level prompt for the integration process based on the set of objectives and any component definitions;

input the process-level prompt to the generative AI model to produce a process definition; and generate a software instance of the integration process based on the process definition.

\* \* \* \* \*